United States Patent
Piper et al.

(10) Patent No.: US 12,360,571 B1
(45) Date of Patent: Jul. 15, 2025

(54) ENHANCED PORTABLE ELECTRONIC DEVICE CASE HANDLE SYSTEM

(71) Applicant: Pioneer Square Brands, Inc., High Point, NC (US)

(72) Inventors: Brian Lewis Piper, Seattle, WA (US); Michael Cooper Ferren, Camus, WA (US); Sudeep Balkrishna Agalgaonkar, Jamestown, NC (US); William Miles Haskins, Kernersville, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 18/887,039

(22) Filed: Sep. 17, 2024

(51) Int. Cl.
*G06F 1/16* (2006.01)

(52) U.S. Cl.
CPC .................................. *G06F 1/1656* (2013.01)

(58) Field of Classification Search
CPC ...................................................... G06F 1/1656
See application file for complete search history.

(56) References Cited

U.S. PATENT DOCUMENTS

| | | | | |
|---|---|---|---|---|
| 6,016,248 A * | 1/2000 | Anzai | ..................... | G06F 1/166 248/463 |
| 6,301,101 B1 * | 10/2001 | Anzai | ..................... | G06F 1/166 248/688 |
| 8,490,789 B2 * | 7/2013 | Lach | ..................... | A45C 11/00 361/679.01 |
| 8,879,250 B2 * | 11/2014 | Franz | ..................... | G06F 1/166 455/575.8 |
| 9,141,145 B2 * | 9/2015 | White | ................... | H05K 5/0004 |
| 9,204,697 B2 * | 12/2015 | Yang | ..................... | A45C 11/00 |
| 9,210,977 B2 * | 12/2015 | Lach | ..................... | A45C 11/00 |
| 9,408,317 B1 * | 8/2016 | Luo | ........................ | G06F 1/1601 |
| 9,930,943 B2 * | 4/2018 | Lach | ..................... | H04B 1/3888 |
| 2011/0286171 A1 * | 11/2011 | Franz | ..................... | F16M 11/105 361/679.01 |
| 2011/0299231 A1 * | 12/2011 | Gaddis, II | .............. | H05K 5/023 361/679.01 |
| 2017/0295656 A1 * | 10/2017 | Tsai | ....................... | F16M 11/38 |

* cited by examiner

*Primary Examiner* — Lisa Lea-Edmonds
(74) *Attorney, Agent, or Firm* — Grandview Law

(57) ABSTRACT

Systems involve implementations such as a case system for a portable electronic device a base, a handle assembly including first and second end portions slidably coupled with the base and a center portion positioned between the first and second end portions. The handle assembly is movable between a retracted first position and an extended second position. The case system can remain in a first standing orientation with a first portion of the case system and a portion of the handle assembly contacting a horizontal surface. The case system can remain in a second standing orientation with a second portion of the case system and a portion of the handle assembly contacting a horizontal surface. Other aspects are described in the claims, drawings, and text forming a part of the present disclosure.

18 Claims, 19 Drawing Sheets

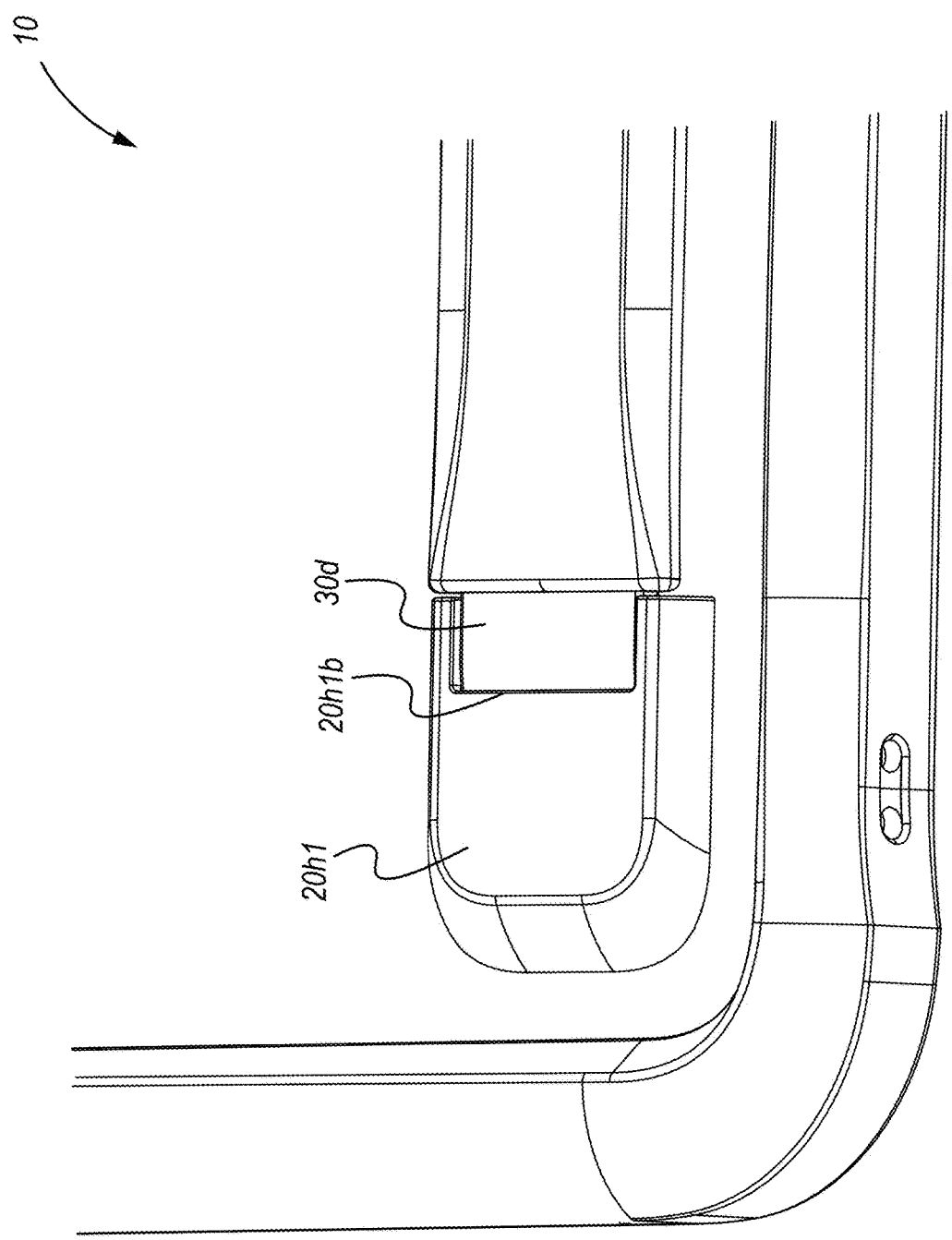

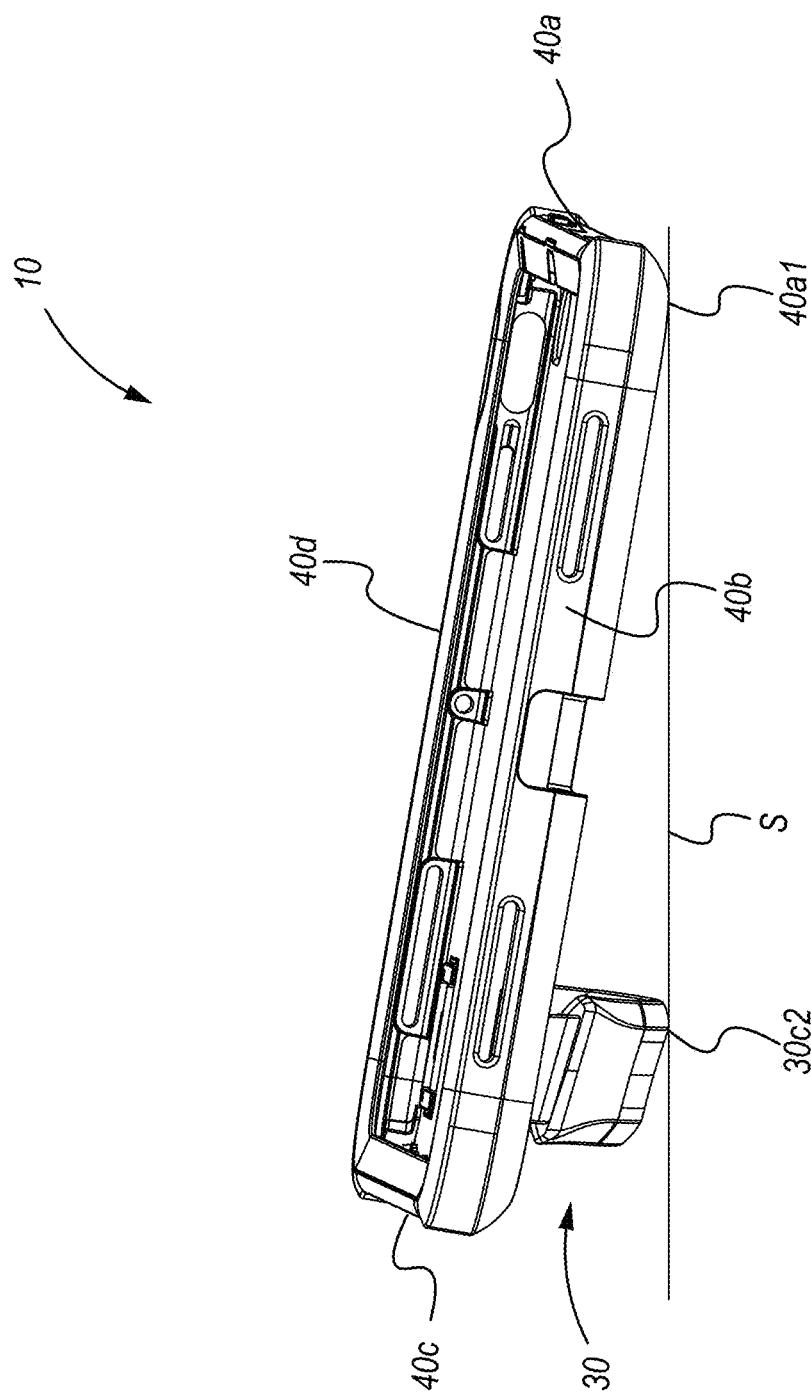

ENHANCED PORTABLE ELECTRONIC DEVICE CASE HANDLE SYSTEM

SUMMARY

In one or more aspects a case system for a portable electronic device includes (I) a interior assembly including (A) a base, (B) a first engagement component, and (C) a second engagement component; (II) an exterior assembly including (A) a first side extending from the base, (B) a second side extending from the base and extending perpendicular to the first side, (C) a third side extending from the base and extending perpendicular to the second side, (D) a fourth side extending from the base and extending perpendicular to the first side, wherein the first engagement component is closer to the first side than to the third side, and wherein the second engagement component is closer to the first side than to the third side; and (III) a handle assembly including (A) a first end portion removably couplable with the first engagement component, (B) a second end portion removably couplable with the second engagement component, (C) a center portion positioned between the first end portion and the second end portion, wherein when the handle assembly is coupled to the first engagement component and the second engagement component, the handle assembly is movable between a retracted first position and an extended second position, wherein the center portion is adjacent the base when the handle assembly is in the retracted first position, wherein the center portion is spaced away from the base when the handle assembly is in the extended second position, wherein when the handle assembly is in the extended second position, the case system can remain in a first standing orientation with a first portion of the case system and a portion of the handle assembly contacting a horizontal surface, and with the case system containing the portable electronic device, wherein when the handle assembly is in the extended second position, the case system can remain in a second standing orientation with a second portion of the case system and a portion of the handle assembly contacting a horizontal surface, and with the case system containing the portable electronic device, and wherein the first portion of the case system is nearer to the handle assembly than second portion of the case system is to the handle assembly.

In implementations at least one frictional resistant force is imparted on the first end portion of the handle assembly to at least in part oppose at least one force imparted on the center portion of the handle assembly when the case system is in the first standing orientation and when the case system is in the second standing orientation thereby at least in part preventing the handle assembly from moving from the extended second position toward the retracted first position when the case system is in the first standing orientation and when the case system is in the second standing orientation.

Implementations further include a first pin with first and second ends, the first pin coupled with the first end of the handle assembly, wherein the first engagement component includes a first track groove and a second track groove, wherein at least a portion of the at least one frictional resistant force is based upon friction between the first end of the first pin and the first track groove, and wherein at least a portion of the at least one frictional resistant force is based upon friction between the second end of the first pin and the second track groove. In implementations the first pin is a steel alloy and the first track groove is polycarbonate.

In implementations the handle assembly is a semi-rigid material to at least in part oppose at least one force imparted on the center portion of the handle assembly when the case system is in the first standing orientation and when the case system is in the second standing orientation thereby at least in part preventing the handle assembly from moving from the extended second position toward the retracted first position when the case system is in the first standing orientation and when the case system is in the second standing orientation. In implementations the handle assembly is a thermoplastic polyurethane material. In implementations the handle assembly has a density of Shore 70 a.

In implementations the handle assembly is thermoplastic overmolded on a semi-rigid substrate to at least in part oppose at least one force imparted on the center portion of the handle assembly when the case system is in the first standing orientation and when the case system is in the second standing orientation thereby at least in part preventing the handle assembly from moving from the extended second position toward the retracted first position when the case system is in the first standing orientation and when the case system is in the second standing orientation. In implementations the semi-rigid substrate is spring steel. In implementations the semi-rigid substrate is semi-rigid plastic.

In implementations the handle assembly is a semi-rigid material and at least one frictional resistant force is imparted on the first end portion of the handle assembly to at least in part oppose at least one force imparted on the center portion of the handle assembly when the case system is in the first standing orientation and when the case system is in the second standing orientation thereby at least in part preventing the handle assembly from moving from the extended second position toward the retracted first position when the case system is in the first standing orientation and when the case system is in the second standing orientation. In implementations the handle assembly is in the extended second position, the center portion extends from the base at least 1.5 inches. In implementations the case weighs at least 6 ounces and the portable electronic device weighs at least 6 ounces. In implementations the case weighs at least one pound and the portable electronic device weighs at least one pound. In implementations the case weighs at least 1.5 pounds and the portable electronic device weighs at least 1.5 pounds.

In one or more aspects a case system for a portable electronic computing device includes (I) an interior assembly including (A) a base, (B) a first engagement component, and (C) a second engagement component; (II) an exterior assembly including (A) a first side extending from the base, (B) a second side extending from the base and extending perpendicular to the first side, (C) a third side extending from the base and extending perpendicular to the second side, (D) a fourth side extending from the base and extending perpendicular to the first side, wherein the first engagement component is closer to the first side than to the third side, and wherein the second engagement component is closer to the first side than to the third side; and (III) a handle assembly including (A) a first end portion removably slidably couplable with the first engagement component, (B) a second end portion removably slidably couplable with the second engagement component, (C) a center portion positioned between the first end portion and the second end portion, wherein when the handle assembly is coupled to the first engagement component and the second engagement component, the handle assembly is movable between a retracted first position and an extended second position, wherein the center portion is adjacent the base when the handle assembly is in the retracted first position, wherein the center portion is spaced away from the base when the handle assembly is in the extended second position, and wherein the handle assembly can remain in the extended second position when at least 1.5 pounds of force is applied to any portion of the handle assembly.

In implementations at least one first frictional resistant force is imparted on the first end portion of the handle assembly to at least in part oppose at least one force imparted on the handle assembly in the extended second position, and wherein at least one second frictional resistant force is imparted on the second end portion of the handle assembly to at least in part oppose at least one force imparted on the handle assembly in the extended second position. In implementations the handle assembly is a semi-rigid material to at least in part oppose at least one force imparted on the handle assembly in the extended second position.

In one or more aspects a case system for a portable electronic computing device includes (I) a base, (II) a handle assembly including (A) a first end portion slidably coupled with the base, (B) a second end portion slidably coupled with the base, (C) a center portion positioned between the first end portion and the second end portion, wherein the handle assembly is movable between a retracted first position and an extended second position, wherein the center portion is adjacent the base when the handle assembly is in the retracted first position, wherein the center portion is spaced away from the base when the handle assembly is in the extended second position, wherein when the handle assembly is in the extended second position, the case system can remain in a first standing orientation with a first portion of the case system and a portion of the handle assembly contacting a horizontal surface, and with the case system containing the portable electronic device, wherein when the handle assembly is in the extended second position, the case system can remain in a second standing orientation with a second portion of the case system and a portion of the handle assembly contacting a horizontal surface, and with the case system containing the portable electronic device, and wherein the first portion of the case system is nearer to the handle assembly than second portion of the case system is to the handle assembly.

In implementations the handle assembly is a semi-rigid material, at least one frictional resistant force is imparted on the first end portion of the handle assembly, and at least one frictional resistant force is imparted on the second end portion of the handle assembly to at least in part oppose at least one force imparted on the center portion of the handle assembly when the case system is in the first standing orientation and when the case system is in the second standing orientation thereby at least in part preventing the handle assembly from moving from the extended second position toward the retracted first position when the case system is in the first standing orientation and when the case system is in the second standing orientation.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Enhanced Portable Electronic Device Case Handle System, articles of manufacture, compositions of matter for same that may provide context, for instance, in introducing one or more processes and/or devices described herein.

FIG. 7A is a enlarged bottom-perspective view of a portion of the case assembly of FIG. 1 with handle in retracted first position.

FIG. 14 is a side-elevational view of the case assembly of FIG. 1 with handle in extended second position and case in second standing orientation.

DETAILED DESCRIPTION

Figure 1:
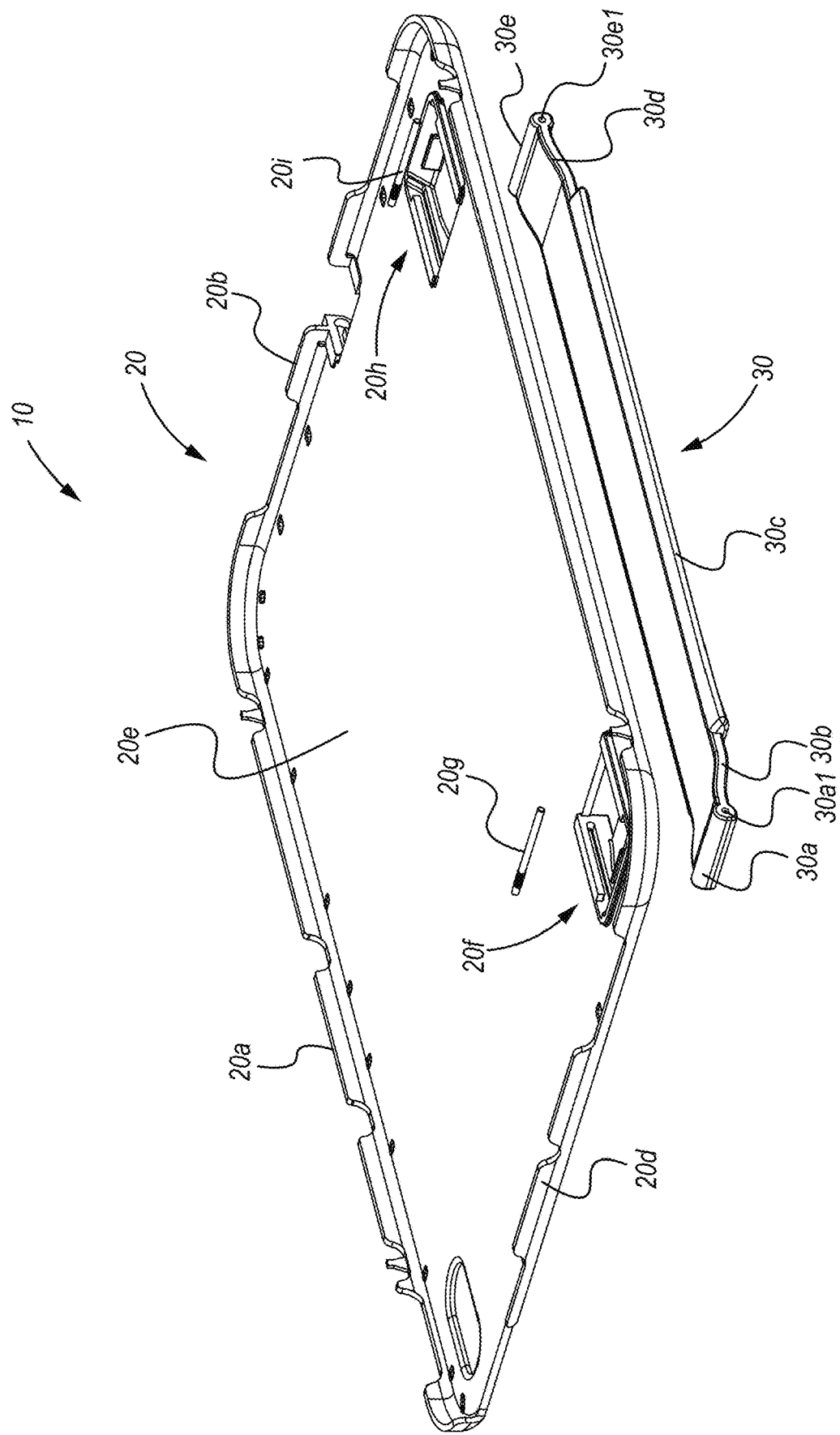
FIG. 1 is an exploded perspective view of a portion of case assembly.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an exploded perspective view of a portion of portable electronic computing device case system 10 including interior assembly 20 and handle assembly 30. In implementations portable electronic computing device case system 10 is configured to hold or contain a portable electronic computing device (not shown) such as a tablet computer. Depicted implementation of interior assembly 20 is shown to include side 20a, side 20b, side 20c, side 20d, base 20e, engagement component 20f that movably couples with pin member 20g having imparted frictional resistant force, which must be overcome in order for pin member 20g to move with respect to engagement component 20f, and engagement component 20h that movably couples with pin member 20i having imparted frictional resistant force, which must be overcome in order for pin member 20i to move with respect to engagement component 20h. In implementations pin member 20g and pin member 20i can be made from a steel alloy, other metal alloy, or other material of a similar hardness.

Depicted implementation of handle assembly 30 is shown to include end portion 30a with aperture 30a1, mid portion 30b, center portion 30c, mid portion 30d, end portion 30e, and edge 20e1. In implementations handle assembly 30 can be made from a semi-rigid material such as a thermoplastic polyurethane material and/or having a density such as Shore 70 a to at least in part oppose one or more forces imparted on handle assembly 30 or other portions of handle assembly 30. In implementations handle assembly 30 can be made from thermoplastic overmolded on a semi-rigid substrate to at least in part oppose one or more forces imparted on handle assembly 30 or other portions of handle assembly 30. In some implementations the semi-rigid substrate can be spring steel, or semi-rigid plastic. In implementations portable electronic computing device case system 10 at least 6 ounces and a portable electronic computing device that could be thereby contained or held weighs at least 6 ounces. In other implementations portable electronic computing device case system 10 at least one pound and a portable electronic computing device that could be thereby contained or held weighs at least one pound. In other implementations portable electronic computing device case system 10 at least 1.5 pounds and a portable electronic computing device that could be thereby contained or held weighs at least 1.5 pounds.

Figure 1A:
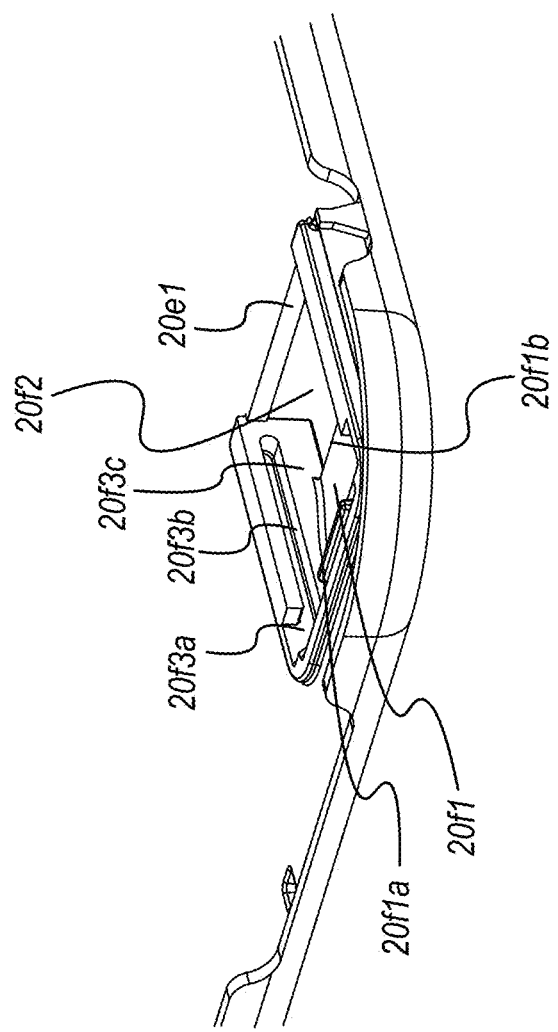
FIG. 1A is an enlarged exploded perspective view of a portion of case assembly of FIG. 1.

Turning to FIG. 1A, depicted therein is an enlarged exploded perspective view of a portion of portable electronic computing device case system 10 of FIG. 1. Depicted implementation of interior assembly 20 is shown to include edge 20e1, base 20f1 with stop 20f1a and edge 20f1b, opening 20f2, side 20f3 with track entrance 20f3a and track groove 20f3b. In implementations movable coupling of pin member 20g with track groove 20f3b such as made from a polycarbonate or other material of similar hardness can contribute to friction forces between pin member 20g and engagement component 20f as described above regarding FIG. 1.

Figure 1B:
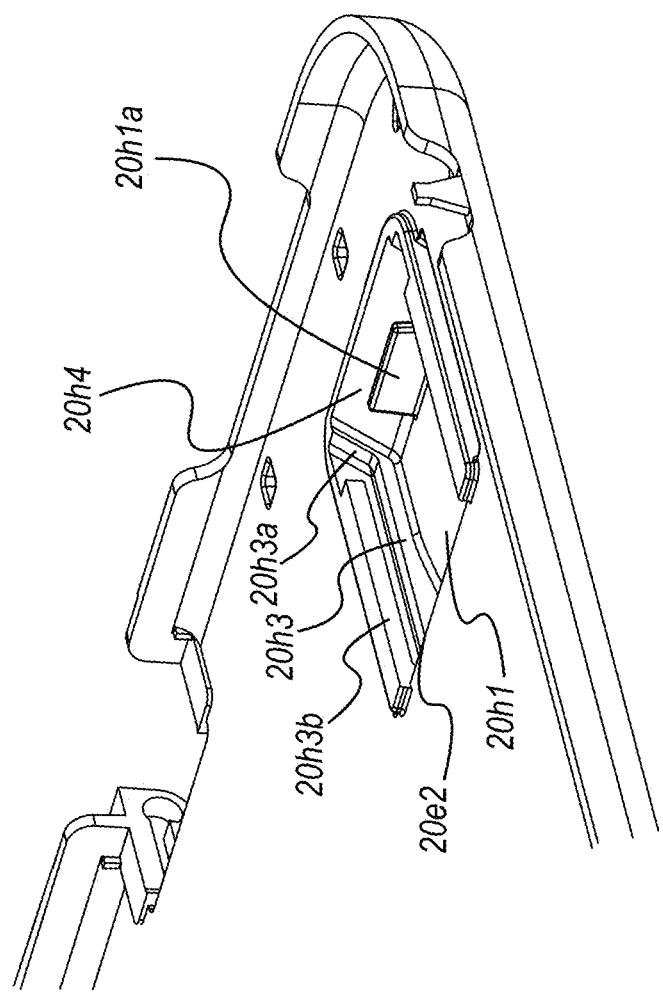
FIG. 1B is an enlarged exploded perspective view of a portion of case assembly of FIG. 1.

Turning to FIG. 1B, depicted therein is an enlarged exploded perspective view of a portion of portable electronic computing device case system 10 of FIG. 1. Depicted implementation of interior assembly 20 is shown to include edge 20e2, base 20h1 with stop 20h1a, side 20h3 with track entrance 20h3a and track groove 20h3b, and back 20h4. In implementations movable coupling of pin member 20i with track groove 20h3b such as made from a polycarbonate or other material of similar hardness can contribute to friction forces between pin member 20i and engagement component 20h as described above regarding FIG. 1.

Figure 2:
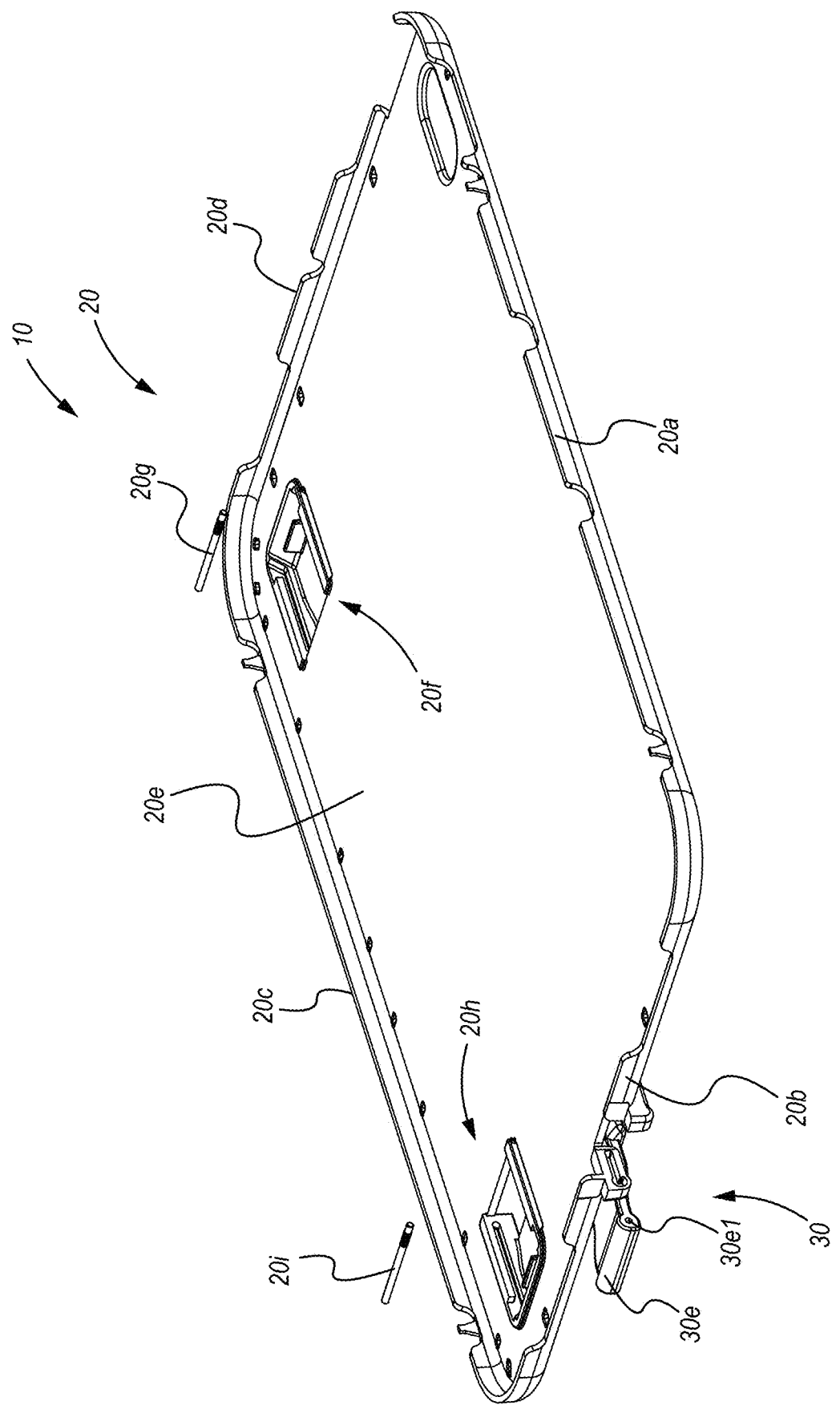
FIG. 2 is an exploded perspective view of a portion of case assembly of FIG. 1.

Turning to FIG. 2, depicted therein is an exploded perspective view of a portion of portable electronic computing device case system 10 of FIG. 1.

Figure 2A:
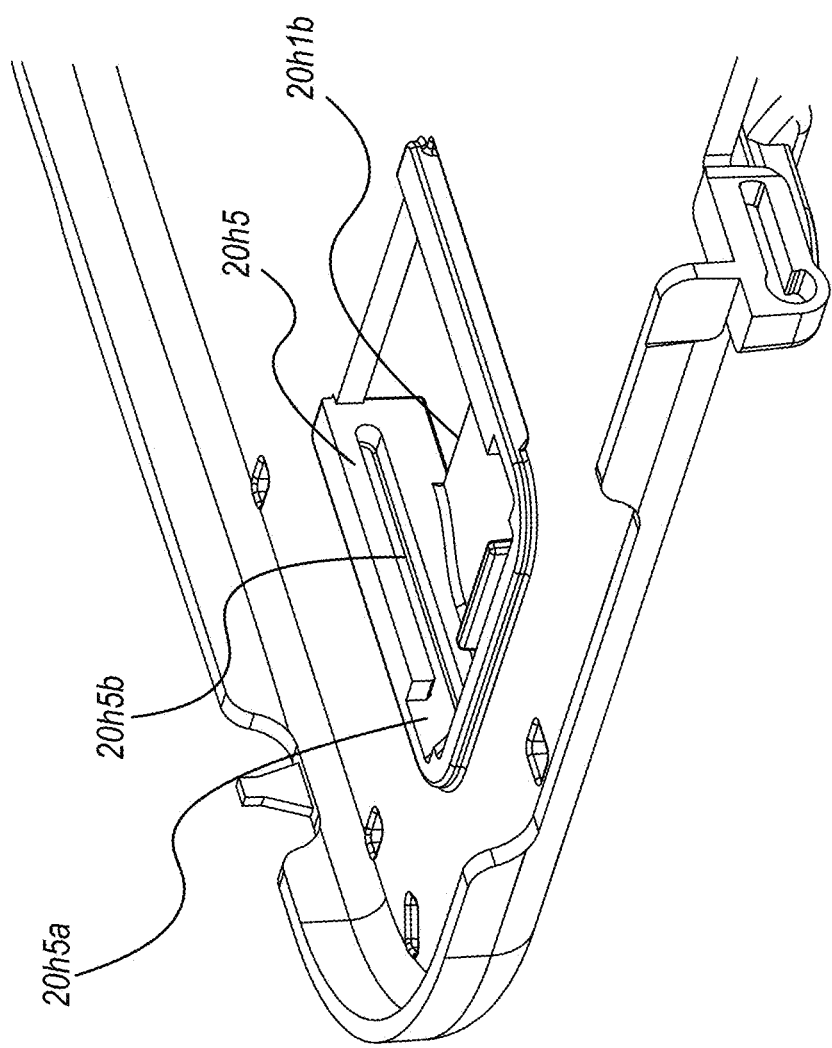
FIG. 2A is an enlarged exploded perspective view of a portion of case assembly of FIG. 1.

Turning to FIG. 2A, depicted therein is an enlarged exploded perspective view of a portion of portable electronic computing device case system 10 of FIG. 1. Depicted implementation of interior assembly 20 is shown to include edge 20h1b, and side 20h5 with track entrance 20h5a and track groove 20h5b. In implementations movable coupling of pin member 20i with track groove 20h5b such as made from a polycarbonate or other material of similar hardness can contribute to friction forces between pin member 20i and engagement component 20h as described above regarding FIG. 1.

Figure 2B:
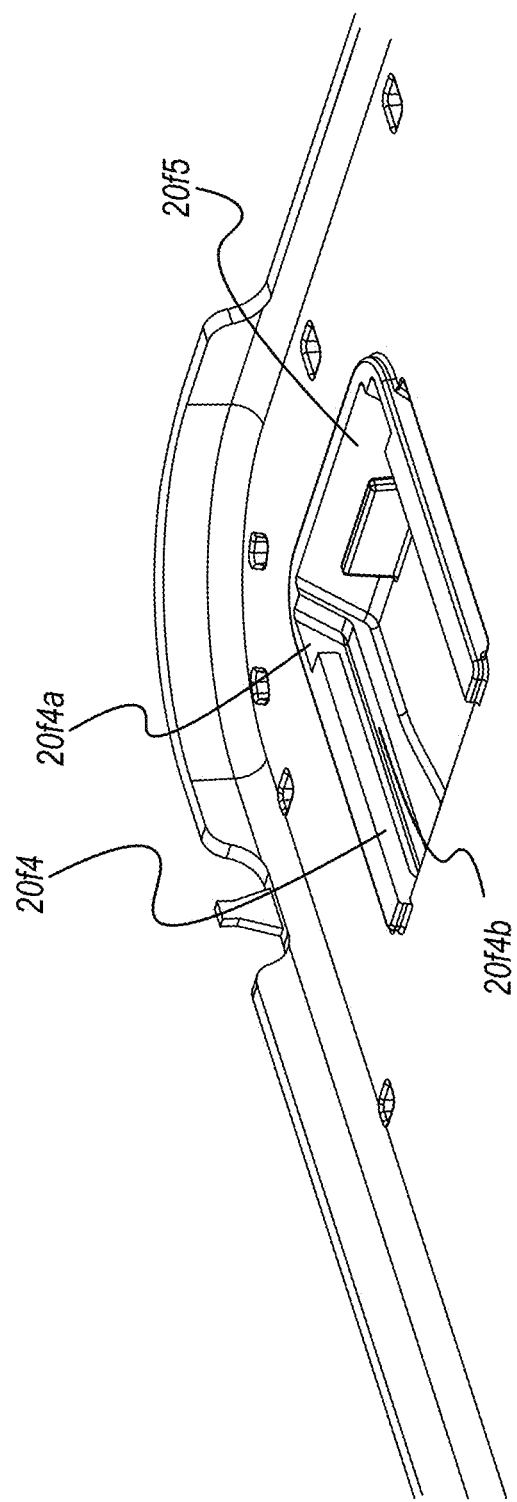
FIG. 2B is an enlarged exploded perspective view of a portion of case assembly of FIG. 1.

Turning to FIG. 2B, depicted therein is an enlarged exploded perspective view of a portion of portable electronic computing device case system 10 of FIG. 1. Depicted implementation of interior assembly 20 is shown to include side 20f4 with track entrance 20f4a and track groove 20f4b, and back 20f5. In implementations movable coupling of pin member 20g with track groove 20f4b such as made from a polycarbonate or other material of similar hardness can contribute to friction forces between pin member 20g and engagement component 20f as described above regarding FIG. 1.

Figure 3:
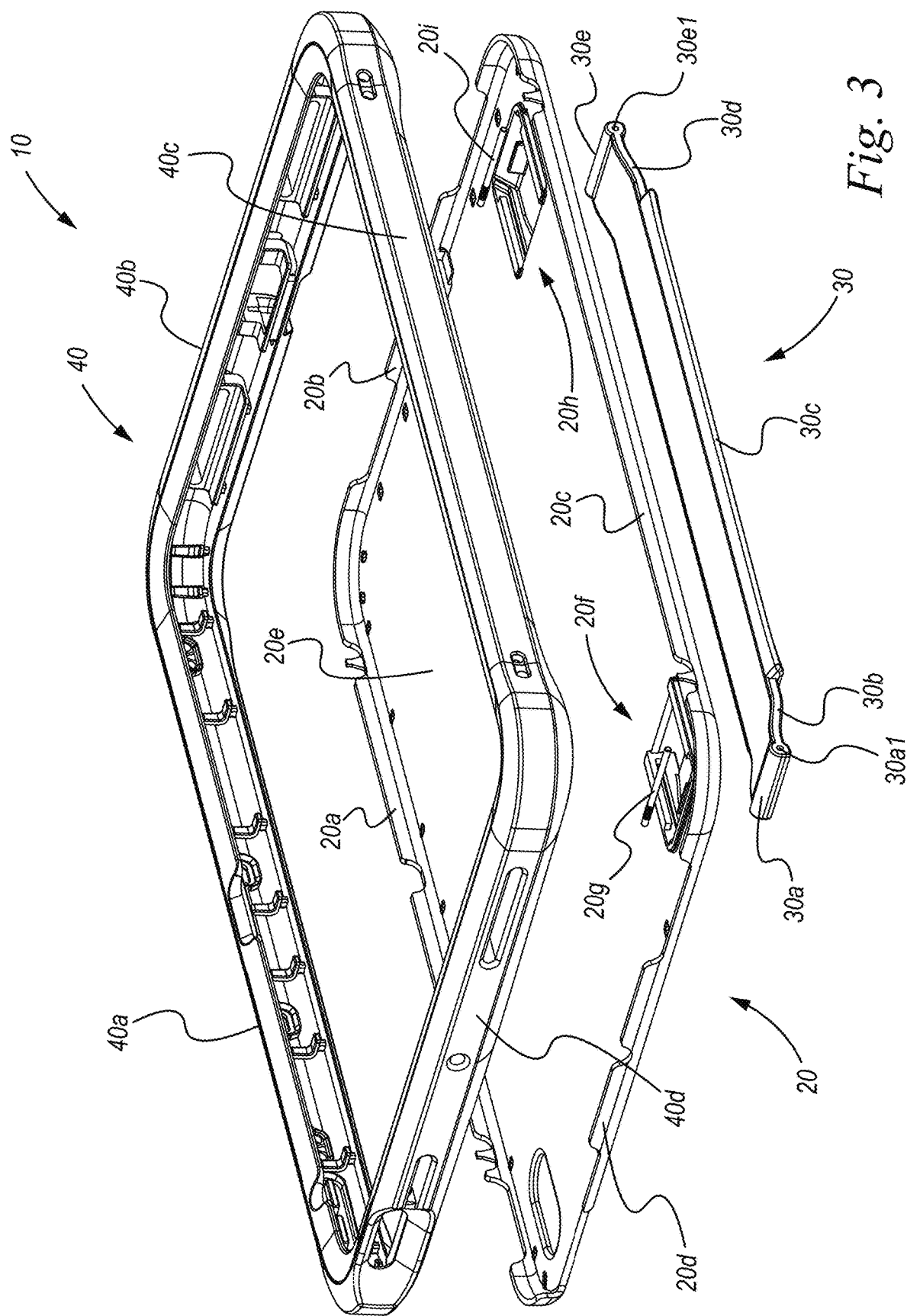
FIG. 3 is an exploded perspective view of a portion of case assembly of FIG. 1.

Turning to FIG. 3, depicted therein is an exploded perspective view of a portion of portable electronic computing device case system 10 of FIG. 1 including exterior assembly 40. Depicted implementation of exterior assembly 40 is shown to include side 40a, side 40b, side 40c, and side 40d.

Figure 4:
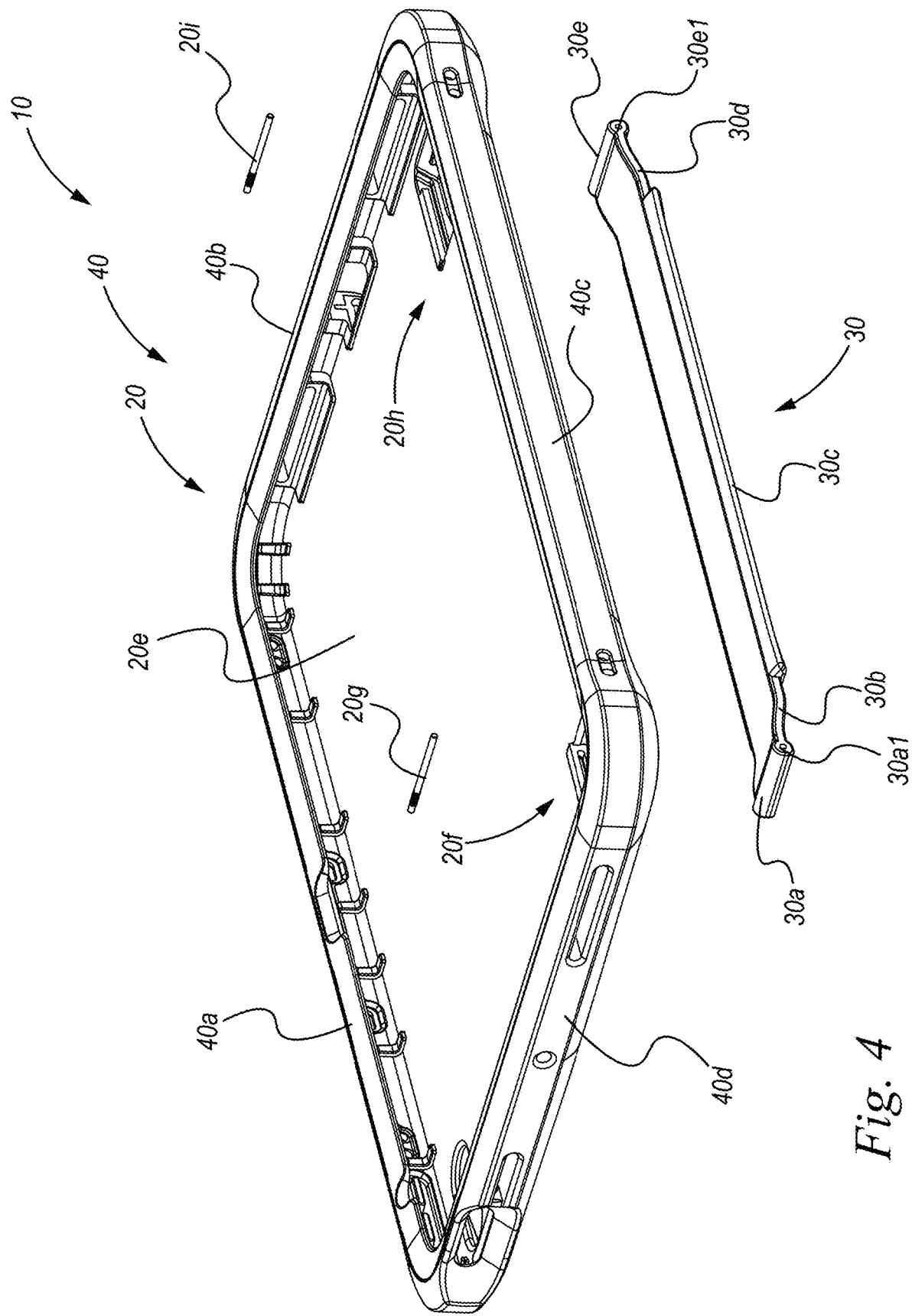
FIG. 4 is a partial exploded perspective view of a portion of case assembly.

Turning to FIG. 4, depicted therein is a partial exploded perspective view of a portion of portable electronic computing device case system 10.

Figure 5:
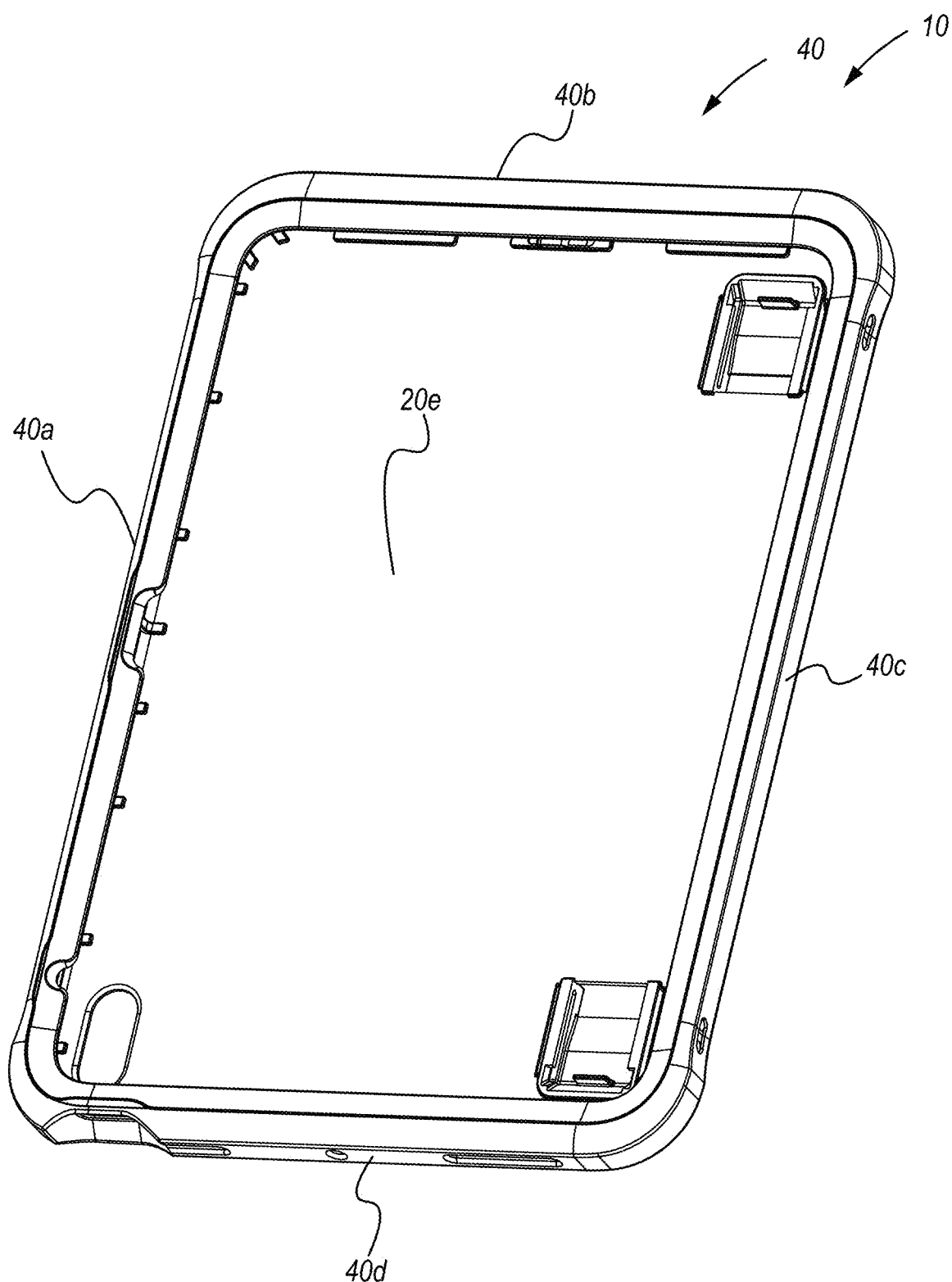
FIG. 5 is a top-perspective view of the case assembly of FIG. 1.

Turning to FIG. 5, depicted therein is a top-perspective view of the portable electronic computing device case system 10 of FIG. 1.

Figure 6:
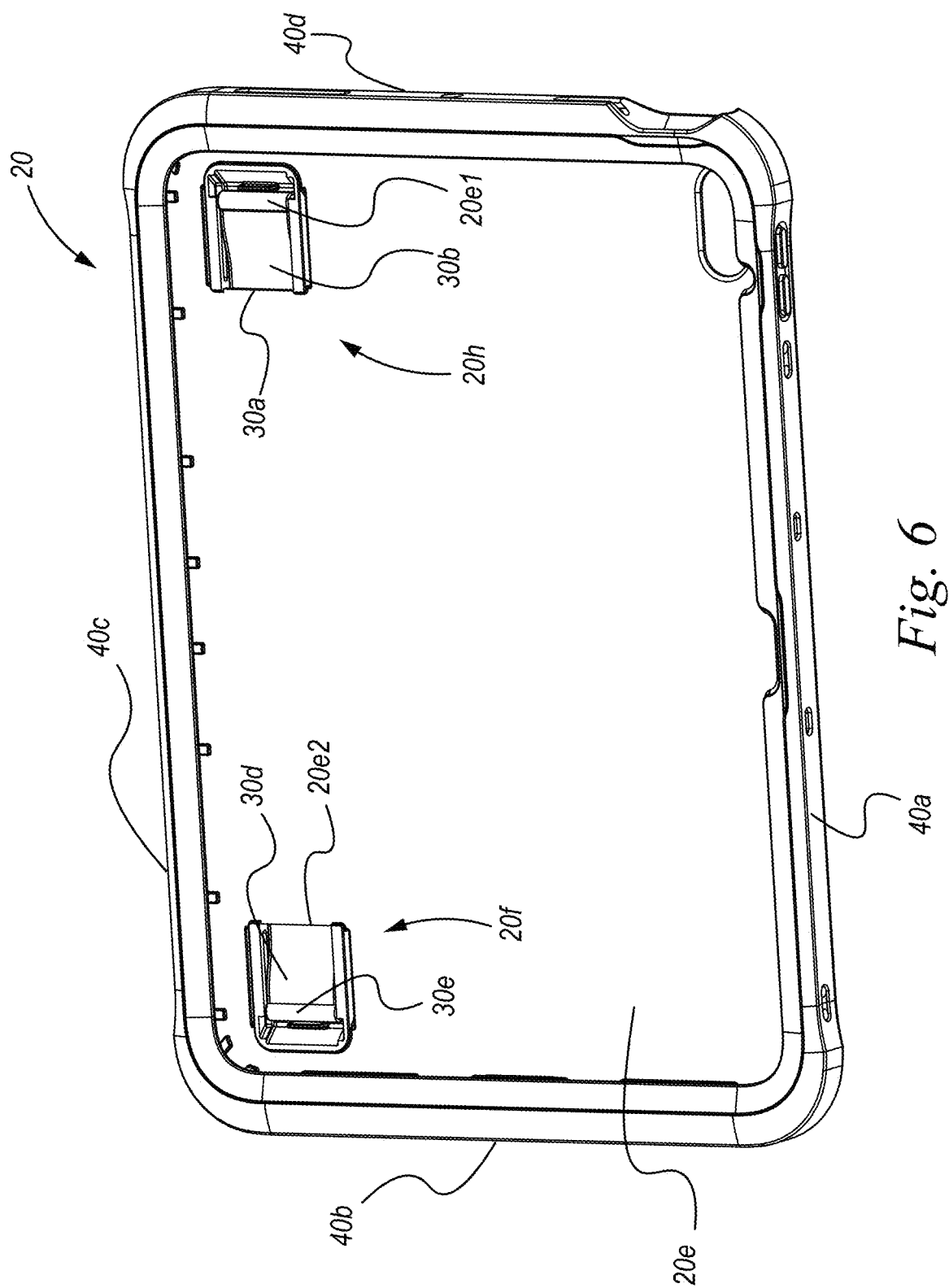
FIG. 6 is a top-perspective view of the case assembly of FIG. 1.

Turning to FIG. 6, depicted therein is a top-perspective view of the portable electronic computing device case system 10 of FIG. 1.

Figure 7:
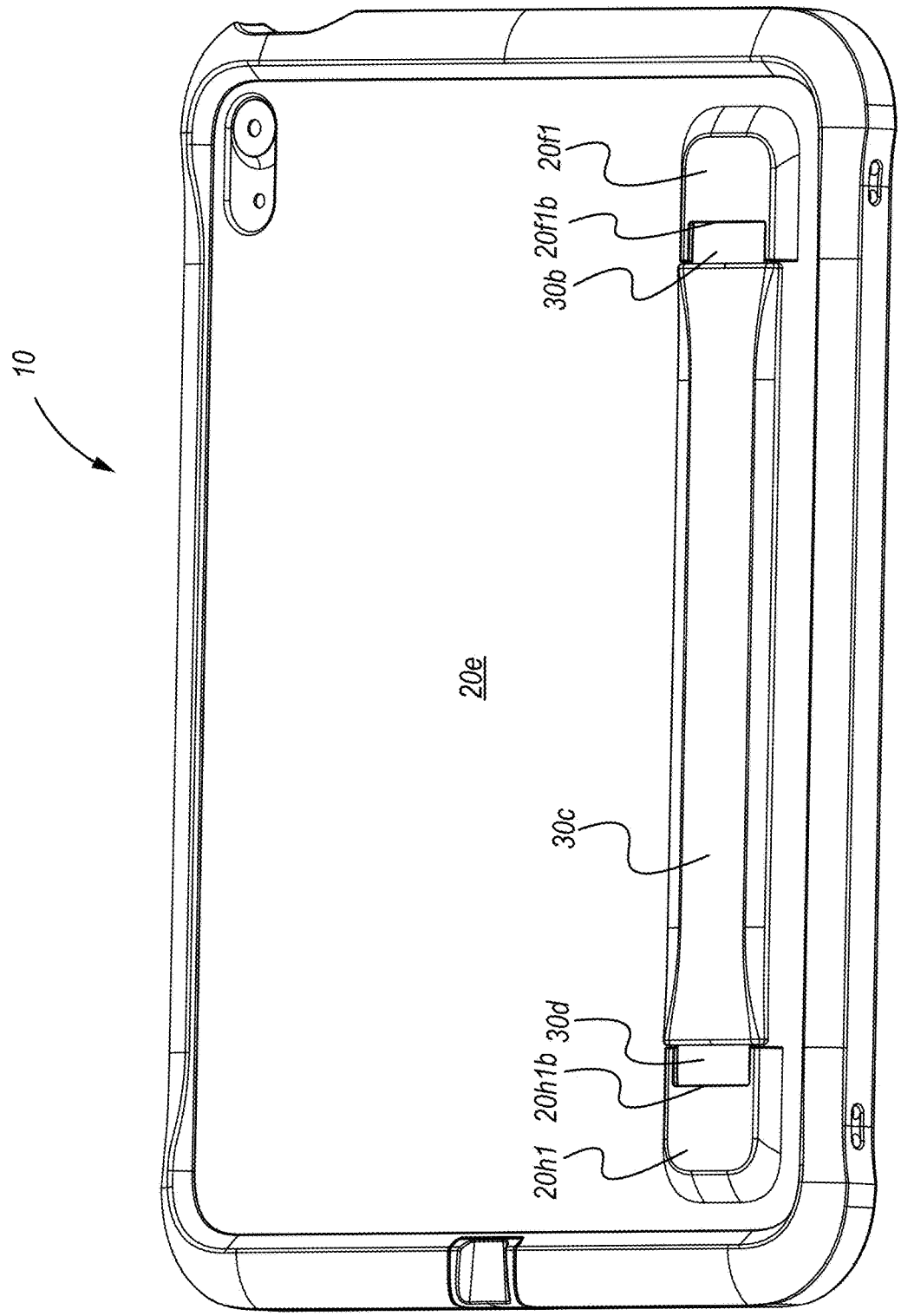
FIG. 7 is a bottom-perspective view of the case assembly of FIG. 1 with handle in retracted first position.

Turning to FIG. 7, depicted therein is a bottom-perspective view of the portable electronic computing device case system 10 of FIG. 1 with handle assembly 30 in retracted first position with center portion 30c adjacent to base 20e.

Turning to FIG. 7A, depicted therein is an enlarged bottom-perspective view of a portion of the portable electronic computing device case system 10 of FIG. 1 with handle assembly 30 in retracted first position.

Figure 8:
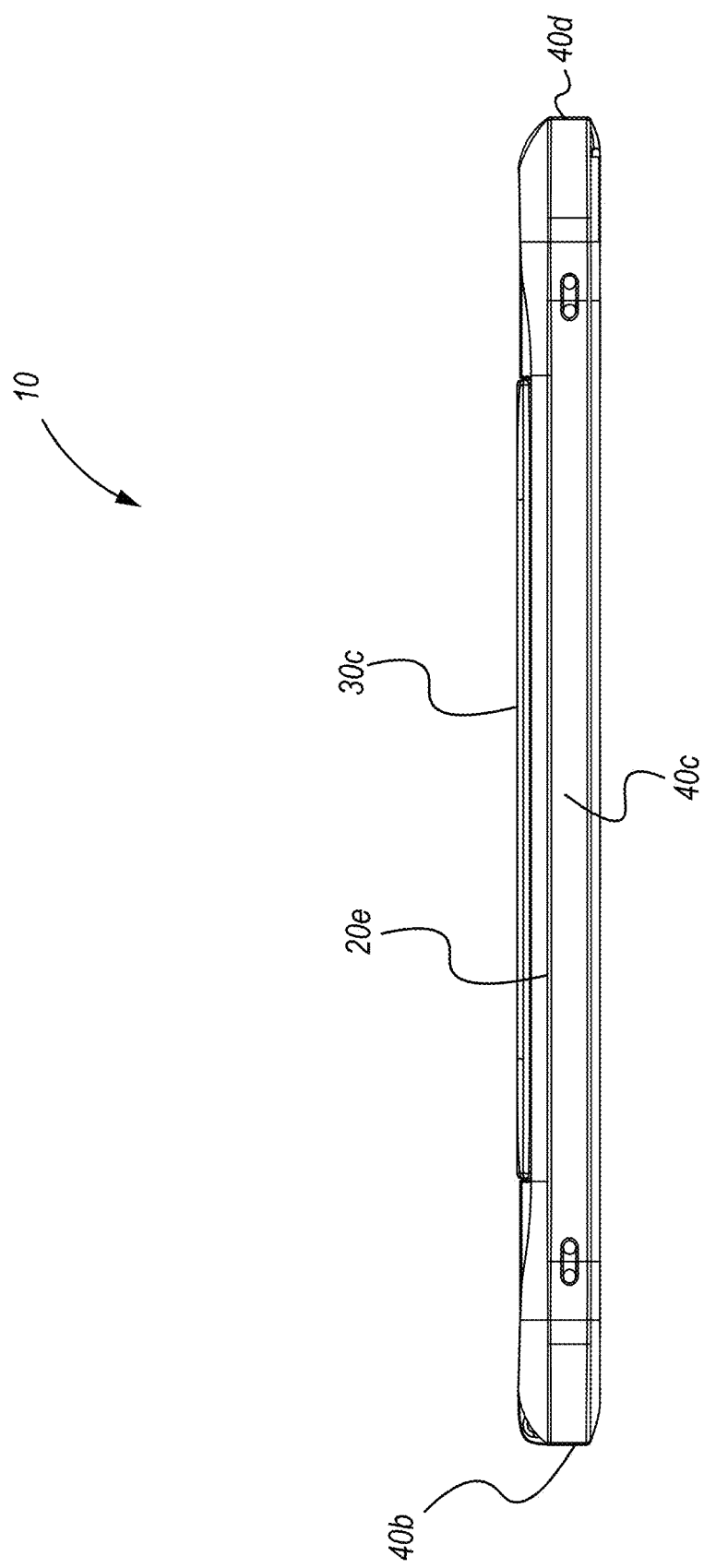
FIG. 8 is a side-elevational view of the case assembly of FIG. 1 with handle in retracted first position.

Turning to FIG. 8, depicted therein a side-elevational view of the portable electronic computing device case system 10 of FIG. 1 with handle assembly 30 in retracted first position.

Figure 9:
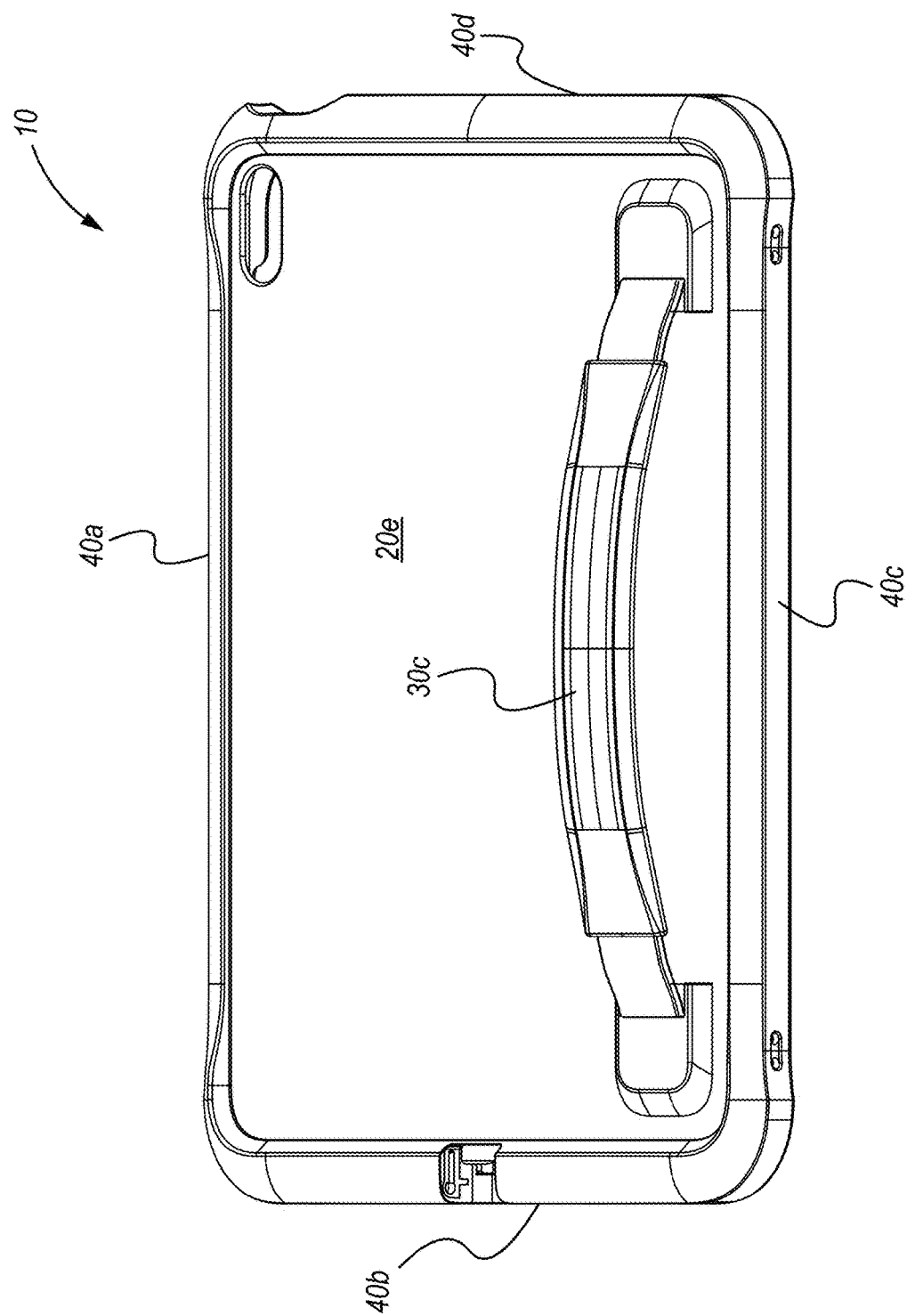
FIG. 9 is a bottom-perspective view of the case assembly of FIG. 1 with handle in extended second position.

Turning to FIG. 9, depicted therein is a bottom-perspective view of the portable electronic computing device case system 10 of FIG. 1 with handle assembly 30 in extended second position with center portion 30c spaced away from base 20e. In some implementations center portion 30c can be spaced away from base 20e at least 1.5 inches.

Figure 10:
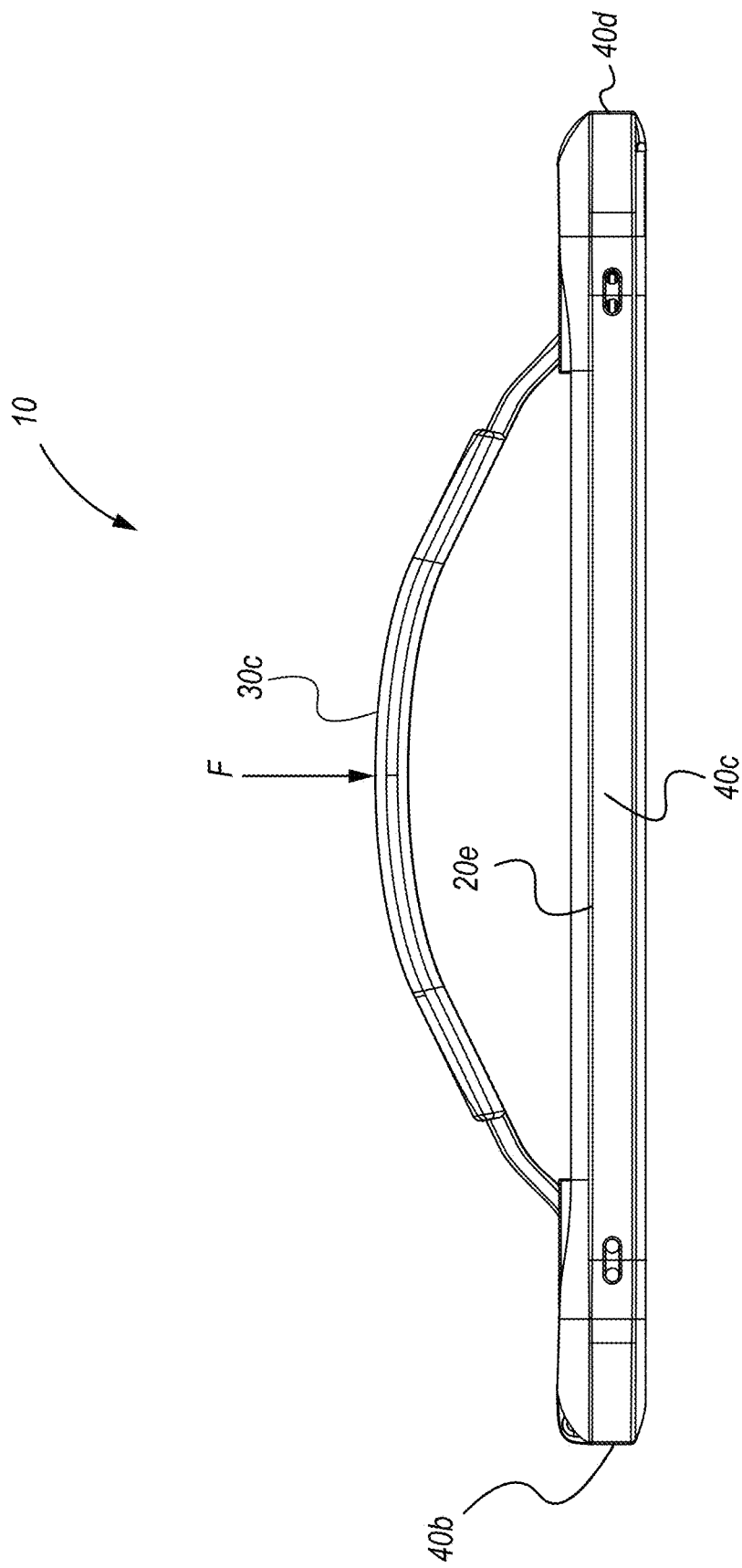
FIG. 10 is a side-elevational view of the case assembly of FIG. 1 with handle in extended second position.

Turning to FIG. 10, depicted therein is a side-elevational view of the portable electronic computing device case system 10 of FIG. 1 with handle assembly 30 in extended second position with force F being applied to center portion 30c without handle assembly 30 moving from extended second position.

Figure 11:
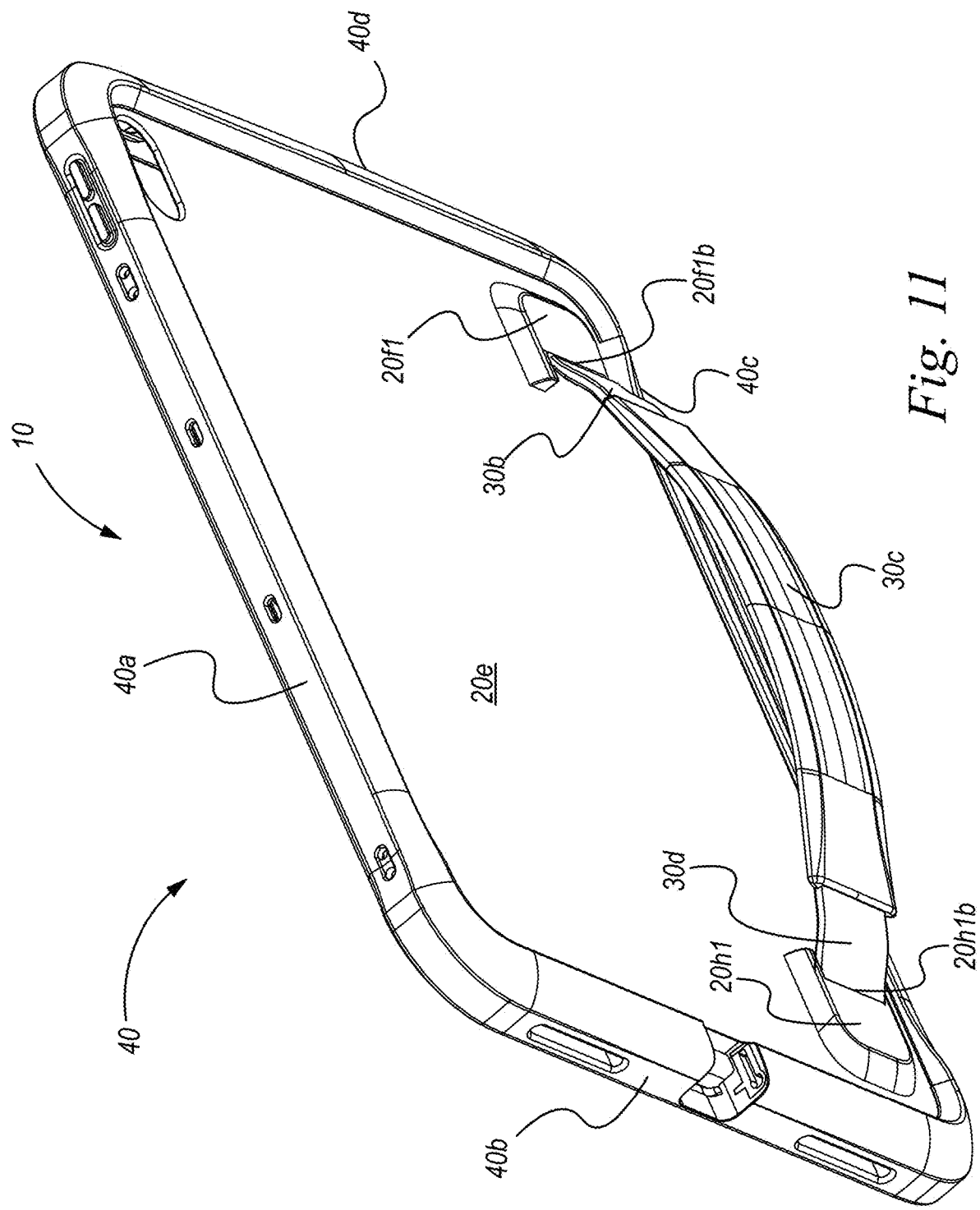
FIG. 11 is a rear-perspective view of the case assembly of FIG. 1 with handle in extended second position and case in first standing orientation.

Turning to FIG. 11, depicted therein is a rear-perspective view of the portable electronic computing device case system 10 of FIG. 1 with handle assembly 30 in extended second position and portable electronic computing device case system 10 in first standing orientation.

Figure 12:
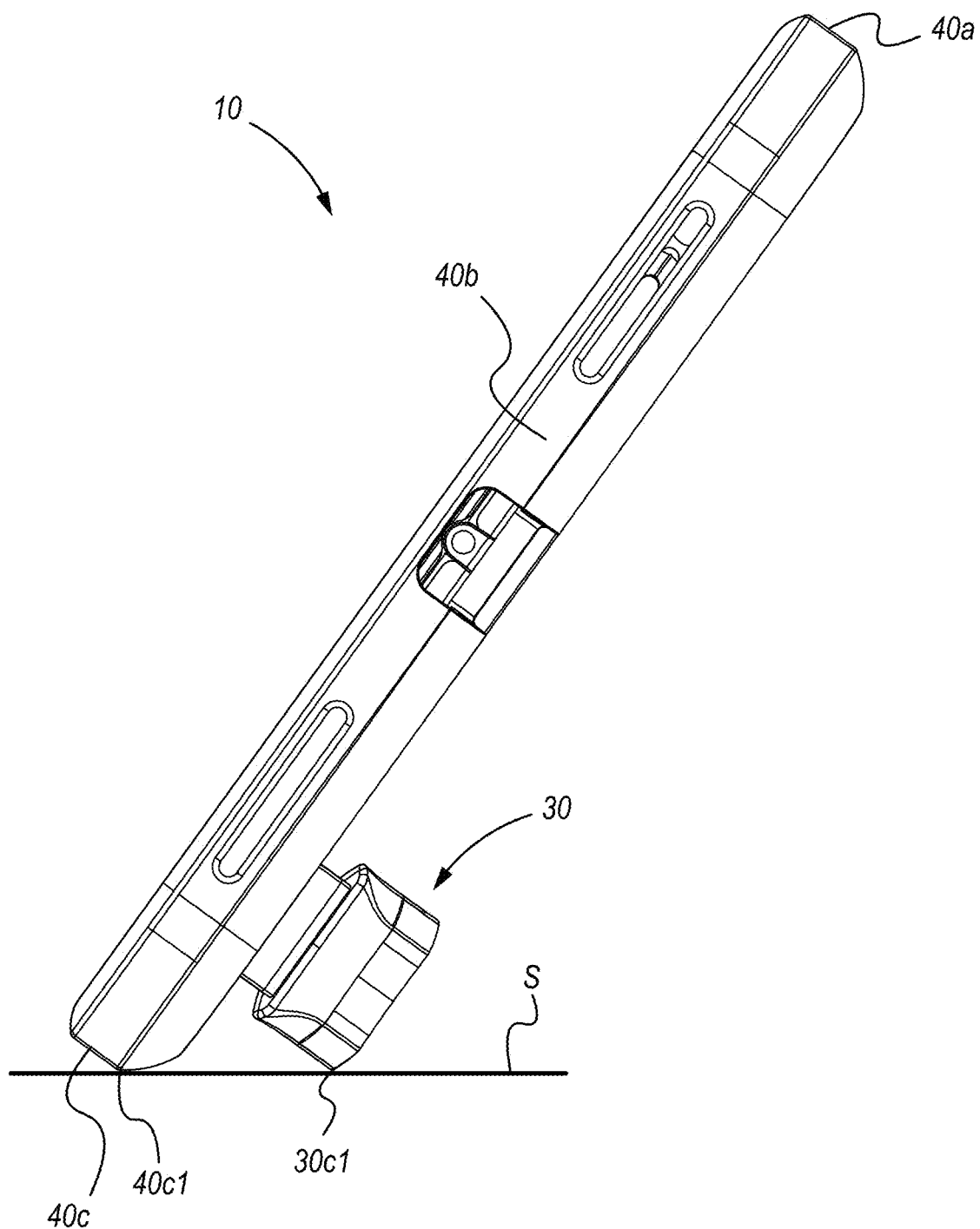
FIG. 12 is a side-elevational view of the case assembly of FIG. 1 with handle in extended second position and case in first standing orientation.

Turning to FIG. 12, depicted therein is a side-elevational view of the portable electronic computing device case system 10 of FIG. 1 with handle assembly 30 in extended second position and portable electronic computing device case system 10 in first standing orientation with edge portion 30c1 of center portion 30c and edge portion 40c1 of side 40c contacting horizonal surface S. The resistant frictional forces described above regarding FIG. 1 at least in part prevent handle assembly 30 from moving toward first retracted position without additional force being applied greater than a threshold force being greater than when portable electronic computing device case system 10 is in first standing orientation.

Figure 13:
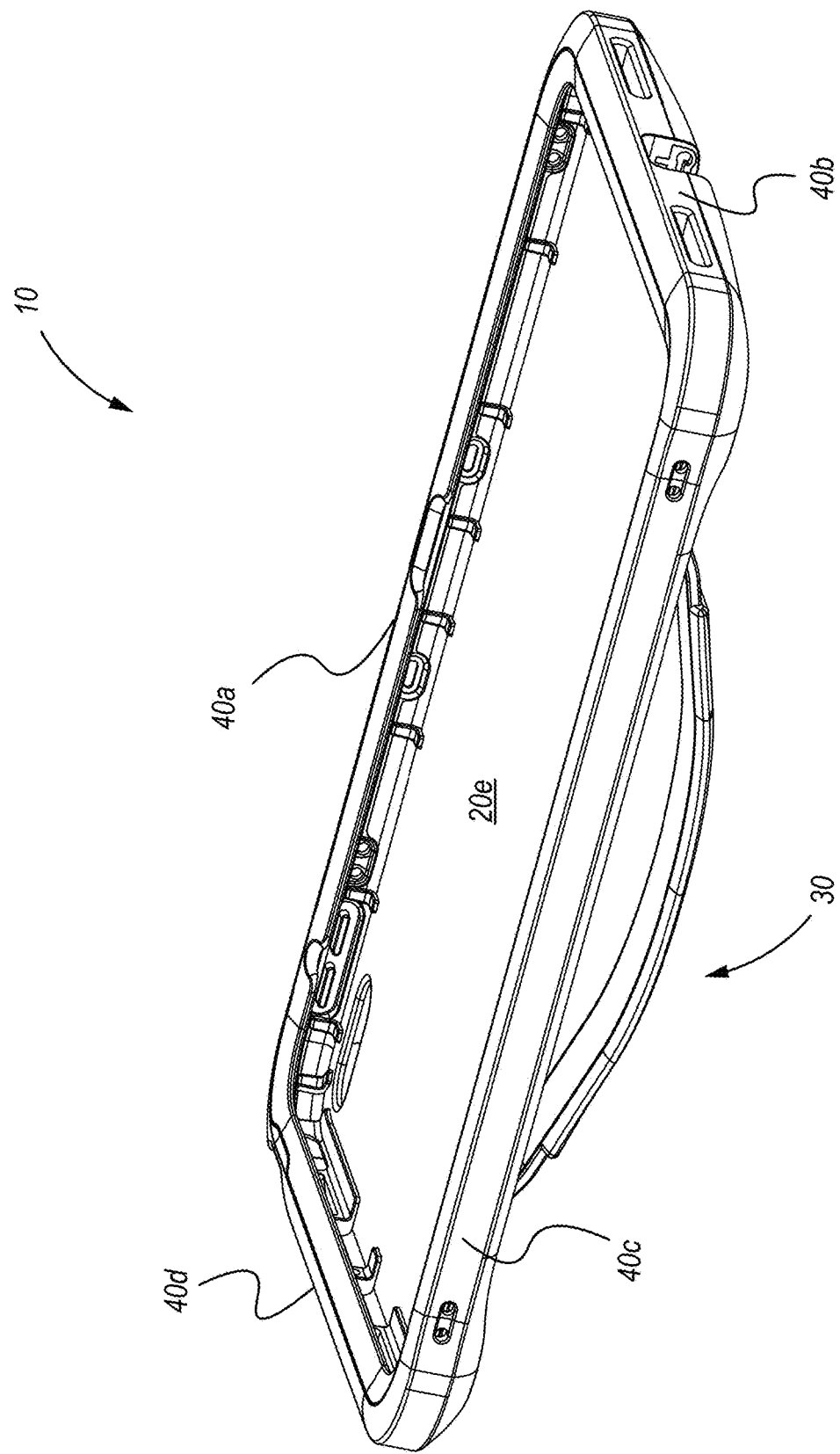
FIG. 13 is a top-perspective view of the case assembly of FIG. 1 with handle in extended second position and case in second standing orientation.

Turning to FIG. 13, depicted therein is a top-perspective view of the portable electronic computing device case system 10 of FIG. 1 with handle assembly 30 in extended second position and portable electronic computing device case system 10 in second standing orientation.

Turning to FIG. 14, depicted therein is a side-elevational view of the portable electronic computing device case system 10 of FIG. 1 with handle assembly 30 in extended second position and portable electronic computing device case system 10 in second standing orientation with edge portion 30c2 of center portion 30c and edge portion 40a1 of side 40a contacting horizonal surface S. The resistant frictional forces described above regarding FIG. 1 at least in part prevent handle assembly 30 from moving toward first retracted position without additional force being applied greater than a threshold force being greater than when portable electronic computing device case system 10 is in second standing orientation.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A case system for a portable electronic device, the system comprising:
   (I) a interior assembly including
      (A) a base,
      (B) a first engagement component, and
      (C) a second engagement component;
   (II) an exterior assembly including
      (A) a first side extending from the base,
      (B) a second side extending, from the base and extending perpendicular to the first side,
      (C) a third side extending from the base and extending perpendicular to the second side,
      (D) a fourth side extending from the base and extending perpendicular to the first side,
      wherein the first engagement component is closer to the first side than to the third side, and
      wherein the second engagement component is closer to the first side than to the third side; and
   (III) a handle assembly including
      (A) a first end portion removably couplable with the first engagement component,
      (B) a second end portion removably couplable with the second engagement component, (C) a center portion positioned between the first end portion and the second end portion, wherein when the handle assembly is coupled to the first engagement component and the second engagement component, the handle assembly is movable between a retracted first position and an extended second position, wherein the center portion is adjacent the base when the handle assembly is in the retracted first position, wherein the center portion is spaced away from the base when the handle assembly is in the extended second position, wherein when the handle assembly is in the extended second position, the case system can remain in a first standing orientation with a first portion of the case system and a portion of the handle assembly contacting a horizontal surface, and with the case system containing the portable electronic device, wherein when the handle assembly is in the extended second position, the case system can remain in a second standing orientation with a second portion of the case system and a portion of the handle assembly contacting a horizontal surface, and with the case system containing the portable electronic device, wherein the first portion of the case system is nearer to the handle assembly than second portion of the case system is to the handle assembly, and wherein at least one frictional resistant force is imparted on the first end portion of the handle assembly to at least in part oppose at least one force imparted on at least a portion of the center portion of the handle assembly when the case system is in the first standing orientation and when the case system is in the second standing orientation thereby at least in part preventing the handle assembly from moving from the extended second position toward the retracted first position when the case system is in the first standing orientation and when the case system is in the second standing orientation.

2. The system of claim 1 further including a first pin with first and second ends, the first pin coupled with the first end of the handle assembly, wherein the first engagement component includes a first track groove and a second track groove, wherein at least a portion of the at least one frictional resistant force is based upon friction between the first end of the first pin and the first track groove, and wherein at least a portion of the at least one frictional resistant force is based upon friction between the second end of the first pin and the second track groove.

3. The system of claim 2
wherein the first pin is a steel alloy and the first track groove is polycarbonate.

4. A case system for a portable electronic device, the system comprising:
(I) a interior assembly including
(A) a base,
(B) a first engagement component, and
(C) a second engagement component;
(II) an exterior assembly including
(A) a first side extending from the base,
(B) a second side extending from the base and extending perpendicular to the first side,
(C) a third side extending from the base and extending perpendicular to the second side,
(D) a fourth side extending from the base and extending perpendicular to the first side, wherein the first engagement component is closer to the first side than to the third side, and wherein the second engagement component is closer to the first side than to the third side; and (III) a handle assembly including
(A) a first end portion removably couplable with the first engagement component,
(B) a second end portion removably couplable with the second engagement component,
(C) a center portion positioned between the first end portion and the second end portion, wherein when the handle assembly is coupled to the first engagement component and the second engagement component, the handle assembly is movable between a retracted first position and an extended second position, wherein the center portion is adjacent the base when the handle assembly is in the retracted first position, wherein the center portion is spaced away from the base when the handle assembly is in the extended second position, wherein when the handle assembly is in the extended second position, the case system can remain in a first standing orientation with a first portion of the case system and a portion of the handle assembly contacting a horizontal surface, and with the case system containing the portable electronic device, wherein when the handle assembly is in the extended second position, the case system can remain in a second standing orientation with a second portion of the case system and a portion of the handle assembly contacting a horizontal surface, and with the case system containing the portable electronic device, wherein the first portion of the case system is nearer to the handle assembly than second portion of the case system is to the handle assembly, wherein the handle assembly is a semi-rigid material to at least in part oppose at least one force imparted on the center portion of the handle assembly when the case system is in the first standing orientation and when the case system is in the second standing orientation thereby at least in part preventing the handle assembly from moving from the extended second position toward the retracted first position when the case system is in the first standing orientation and when the case system is in the second standing orientation, and wherein the handle assembly is a thermoplastic polyurethane material.

5. A case system for a portable electronic device, the system comprising:
(I) a interior assembly including
(A) a base,
(B) a first engagement component, and
(C) a second engagement component;
(II) an exterior assembly including
(A) a first side extending from the base,
(B) a second side extending from the base and extending perpendicular to the first side,
(C) a third side extending from the base and extending perpendicular to the second side,
(D) a fourth side extending from the base and extending perpendicular to the first side, wherein the first engagement component is closer to the first side than to the third side, and wherein the second engagement component is closer to the first side than to the third side; and (III) a handle assembly including
  (A) a first end portion removably couplable with the first engagement component,
  (B) a second end portion removably couplable with the second engagement component,
  (C) a center portion positioned between the first end portion and the second end portion,
  wherein when the handle assembly is coupled to the first engagement component and the second engagement component, the handle assembly is movable between a retracted first position and an extended second position,
  wherein the center portion is adjacent the base when the handle assembly is in the retracted first position,
  wherein the center portion is spaced away from the base when the handle assembly is in the extended second position,
  wherein when the handle assembly is in the extended second position, the case system can remain in a first standing orientation with a first portion of the case system and a portion of the handle assembly contacting a horizontal surface, and with the case system containing the portable electronic device,
  wherein when the handle assembly is in the extended second position, the case system can remain in a second standing orientation with a second portion of the case system and a portion of the handle assembly contacting a horizontal surface, and with the case system containing the portable electronic device,
  wherein the first portion of the case system is nearer to the handle assembly than second portion of the case system is to the handle assembly,
 wherein the handle assembly is a semi-rigid material to at least in part oppose at least one force imparted on the center portion of the handle assembly when the case system is in the first standing orientation and when the case system is in the second standing orientation thereby at least in part preventing the handle assembly from moving from the extended second position toward the retracted first position when the case system is in the first standing orientation and when the case system is in the second standing orientation, and
 wherein the handle assembly has a density of Shore 70 a.

6. A case system for a portable electronic device, the system comprising:
(I) a interior assembly including
  (A) a base,
  (B) a first engagement component, and
  (C) a second engagement component:
(II) an exterior assembly including
  (A) a first side extending from the base,
  (B) a second side extending from the base and extending perpendicular to the first side,
  (C) a third side extending from the base and extending perpendicular to the second side,
  (D) a fourth side extending from the base and extending perpendicular to the first side,
  wherein the first engagement component is closer to the first side than to the third side, and
  wherein the second engagement component is closer to the first side than to the third side; and
(III) a handle assembly including
  (A) a first end portion removably couplable with the first engagement component,
  (B) a second end portion removably couplable with the second engagement component,
  (C) a center portion positioned between the first end portion and the second end portion,
  wherein when the handle assembly is coupled to the first engagement component and the second engagement component, the handle assembly is movable between a retracted first position and an extended second position,
  wherein the center portion is adjacent the base when the handle assembly is in the retracted first position,
  wherein the center portion is spaced away from the base when the handle assembly is in the extended second position,
  wherein when the handle assembly is in the extended second position, the case system can remain in a first standing orientation with a first portion of the case system and a portion of the handle assembly contacting a horizontal surface, and with the case system containing the portable electronic device,
  wherein when the handle assembly is in the extended second position, the case system can remain in a second standing orientation with a second portion of the case system and a portion of the handle assembly contacting a horizontal surface, and with the case system containing the portable electronic device,
  wherein the first portion of the case system is nearer to the handle assembly than second portion of the case system is to the handle assembly,
 wherein the handle assembly is a semi-rigid material to at least in part oppose at least one force imparted on the center portion of the handle assembly when the case system is in the first standing orientation and when the case system is in the second standing orientation thereby at least in part preventing the handle assembly from moving from the extended second position toward the retracted first position when the case system is in the first standing orientation and when the case system is in the second standing orientation, and
 wherein the handle assembly is thermoplastic overmolded on a semi-rigid substrate to at least in part oppose at least one force imparted on the center portion of the handle assembly when the case system is in the first standing orientation and when the case system is in the second standing orientation thereby at least in part preventing the handle assembly from moving from the extended second position toward the retracted first position when the case system is in the first standing orientation and when the case system is in the second standing orientation.

7. The system of claim 6
wherein the semi-rigid substrate is spring steel.

8. The system of claim 6
wherein the semi-rigid substrate is semi-rigid plastic.

9. A case system for a portable electronic device, the system comprising:
(I) a interior assembly including
  (A) a base,
  (B) a first engagement component, and
  (C) a second engagement component;
(II) an exterior assembly including
  (A) a first side extending from the base,
  (B) a second side extending from the base and extending perpendicular to the first side,
  (C) a third side extending from the base and extending perpendicular to the second side,
  (D) a fourth side extending from the base and extending perpendicular to the first side, wherein the first engagement component is closer to the first side than to the third side, and
wherein the second engagement component is closer to the first side than to the third side; and
(III) a handle assembly including
  (A) a first end portion removably couplable with the first engagement component,
  (B) a second end portion removably couplable with the second engagement component,
  (C) a center portion positioned between the first end portion and the second end portion,
  wherein when the handle assembly is coupled to the first engagement component and the second engagement component, the handle assembly is movable between a retracted first position and an extended second position,
wherein the center portion is adjacent the base when the handle assembly is in the retracted first position,
wherein the center portion is spaced away from the base when the handle assembly is in the extended second position,
wherein when the handle assembly is in the extended second position, the case system can remain in a first standing orientation with a first portion of the case system and a portion of the handle assembly contacting a horizontal surface, and with the case system containing the portable electronic device,
  wherein when the handle assembly is in the extended second position, the case system can remain in a second standing orientation with a second portion of the case system and a portion of the handle assembly contacting a horizontal surface, and with the case system containing the portable electronic device,
  wherein the first portion of the case system is nearer to the handle assembly than second portion of the case system is to the handle assembly,
wherein the handle assembly is a semi-rigid material to at least in part oppose at least one force imparted on the center portion of the handle assembly when the case system is in the first standing orientation and when the case system is in the second standing orientation thereby at least in part preventing the handle assembly from moving from the extended second position toward the retracted first position when the case system is in the first standing orientation and when the case system is in the second standing orientation, and
wherein the handle assembly is a semi-rigid material and at least one frictional resistant force is imparted on the first end portion of the handle assembly to at least in part oppose at least one force imparted on the center portion of the handle assembly when the case system is in the first standing orientation and when the case system is in the second standing orientation thereby at least in part preventing the handle assembly from moving from the extended second position toward the retracted first position when the case system is in the first standing orientation and when the case system is in the second standing orientation.

10. The system of claim 9
wherein the handle assembly is in the extended second position, the center portion extends from the base at least 1.5 inches.

11. The system of claim 9
wherein the case weighs at least 6 ounces and the portable electronic device weighs at least 6 ounces.

12. The system of claim 9
wherein the case weighs at least one pound and the portable electronic device weighs at least one pound.

13. The system of claim 9
wherein the case weighs at least 1.5 pounds and the portable electronic device weighs at least 1.5 pounds.

14. A case system for a portable electronic device, the system comprising:
(I) an interior assembly including
  (A) a base,
  (B) a first engagement component, and
  (C) a second engagement component;
(II) an exterior assembly including
  (A) a first side extending from the base,
  (B) a second side extending from the base and extending perpendicular to the first side,
  (C) a third side extending from the base and extending perpendicular to the second side,
  (D) a fourth side extending from the base and extending perpendicular to the first side,
  wherein the first engagement component is closer to the first side than to the third side, and
  wherein the second engagement component is closer to the first side than to the third side; and
(III) a handle assembly including
  (A) a first end portion removably slidably couplable with the first engagement component,
  (B) a second end portion removably slidably couplable with the second engagement component,
  (C) a center portion positioned between the first end portion and the second end portion,
  wherein when the handle assembly is coupled to the first engagement component and the second engagement component, the handle assembly is movable between a retracted first position and an extended second position,
  wherein the center portion is adjacent the base when the handle assembly is in the retracted first position,
  wherein the center portion is spaced away from the base when the handle assembly is in the extended second position, and
  wherein the handle assembly can remain in the extended second position when at least 1.5 pounds of force is applied to any portion of the handle assembly.

15. The system of claim 14
wherein at least one first frictional resistant force is imparted on the first end portion of the handle assembly to at least in part oppose at least one force imparted on the handle assembly in the extended second position, and
wherein at least one second frictional resistant force is imparted on the second end portion of the handle assembly to at least in part oppose at least one force imparted on the handle assembly in the extended second position.

16. The system of claim 14
wherein the handle assembly is a semi-rigid material to at least in part oppose at least one force imparted on the handle assembly in the extended second position.

17. A case system for a portable electronic device, the system comprising:
(I) a base,
(II) a handle assembly including
  (A) a first end portion slidably coupled with the base,
  (B) a second end portion slidably coupled with the base, (C) a center portion positioned between the first end portion and the second end portion, wherein the handle assembly is movable between a retracted first position and an extended second position, wherein the center portion is adjacent the base when the handle assembly is in the retracted first position, wherein the center portion is spaced away from the base when the handle assembly is in the extended second position, wherein when the handle assembly is in the extended second position, the case system can remain in a first standing orientation with a first portion of the case system and a portion of the handle assembly contacting a horizontal surface, and with the case system containing the portable electronic device, wherein when the handle assembly is in the extended second position, the case system can remain in a second standing orientation with a second portion of the case system and a portion of the handle assembly contacting a horizontal surface, and with the case system containing the portable electronic device, and wherein the first portion of the case system is nearer to the handle assembly than second portion of the case system is to the handle assembly.

18. The system of claim 17 wherein the handle assembly is a semi-rigid material, at least one frictional resistant force is imparted on the first end portion of the handle assembly, and at least one frictional resistant force is imparted on the second end portion of the handle assembly to at least in part oppose at least one force imparted on the center portion of the handle assembly when the case system is in the first standing orientation and when the case system is in the second standing orientation thereby at least in part preventing the handle assembly from moving from the extended second position toward the retracted first position when the case system is in the first standing orientation and when the case system is in the second standing orientation.

\* \* \* \* \*